United States Patent Office 3,332,464
Patented July 25, 1967

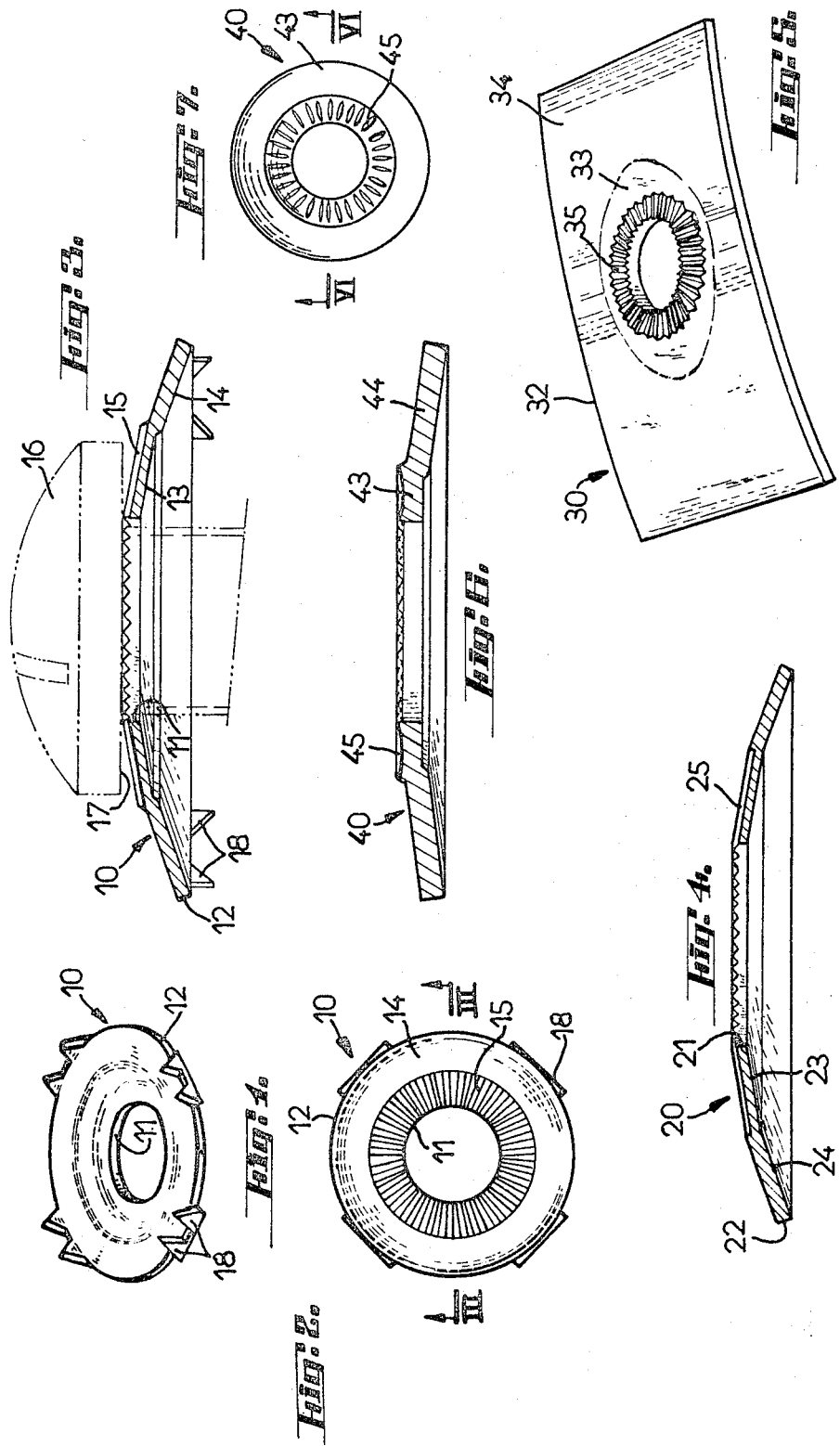

3,332,464
LOCK-WASHERS
Gérard Antoine Louis Castel, Sevres, France, assignor to Nouveautes Mecaniques Electriques: Nomel, Dreux, Eure-et-Loir, France, a corporation of France
Filed Apr. 26, 1965, Ser. No. 450,864
Claims priority, application France, June 26, 1961, 866,086
5 Claims. (Cl. 151—35)

The present invention relates to convex spring lock washers adapted more particularly to span or to cover large holes and to distribute fastener loads over large areas.

Numerous types of washers are known in the art to perform many varied functions in fastener assemblies. They may only be required to afford convenient bearing surfaces for nuts or screws clamping faces, to increase the areas of said bearing surfaces, and to cover or to span oversize clearance holes or elongated holes; plain or flat washers are conveniently used for such purposes.

May be further desired to use the washer as a lock notably for threaded fasteners; in this respect, it is to be noted that the most important factor which keeps a screw, a bolt or a like threaded fastener from loosening, is the tension of the fastener itself; therefore, high screw tension should be expected to prevent the screw from loosening; however, screws and like threaded fasteners actually do come loose for several major reasons, such as vibrations, variances of temperatures, and other service conditions, stretching of the fasteners or relieving of the threads by cold flow. Wherever it is desired to avoid excessive fastener tension and to compensate for any relaxation of the same, resilient or spring washers are conveniently used, and notably cone and like convex washers. However, such convex washers do not have any locking feature other than friction, and in the flattened condition, are equivalent to any flat washer as far as locking action is concerned.

It has been therefore proposed to provide convex spring washers with internal and/or external teeth, which usually consist of warped radial prongs sheared in the inner and outer peripheries of the washer respectively; such toothed lock washers present sharp cutting edges to either or both of the clamping faces of the workpiece and of the nut or the screw head, whereby a damaging gouging or milling action may result whilst torquing the fastener; furthermore, the provision of external and/or internal teeth has for a result to weaken the washer, and thereby to impair its ability to withstand important tension loads.

This last mentioned feature is of utmost importance when tooth lock washers are intended for use with modern design fasteners made from high strength steel, and accordingly capable of exerting high tensile loads, and notably when said washers have dimensions larger than standard, in order either to put pressure away from hole on the workpiece, or to span an oversize clearance hole or elongated hole.

Hitherto known spring lock washers with toothed peripheries are unsuitable for the specific applications contemplated, and this for several reasons.

At first, the washer must be relatively thick to present sufficient stiffness and thereby to maintain high spring-resistance pressure under load; for similar reasons, the washer is preferably made from heat treated, hardened spring steel; accordingly, shearing and warping the peripheral tooth-forming prongs, and keeping the same in proper configuration and alignment in spite of the heat treatment would raise insuperable difficulties during manufacture; besides, due to the nature of the material and to its subsequent heat treatment, said tooth forming prongs could be either too stiff and thereby subject to breakage or too yieldable ad thereby subject to crushing.

In both occurrences, it is self-evident that the desired locking action is substantially impaired.

Then, the presence of notches and other castellations on the peripheries of the previously known tooth lock washers has for an essential drawback substantially to weaken the washer, which is thereby unable to withstand important tensile loads, and to maintain sufficient spring-resistance pressure. More particularly, in the case of a large washer covering an oversize hole, and notably when automatic screw drive means are used for tightening the associated fasteners, application of excessive tightening torque may result in a reverse crowning of the washer, which is obviously detrimental in its effects.

For the several reasons indicated hereinabove, it is highly desirable that a spring lock washer for use with high load fasteners be devoid of peripheral indentations. In this respect, convex tooth lock washers are known in the art, the outer periphery of which is plain: this omission of external teeth does not substantially affect the locking action of the washer, especially when the mean radius of the external bearing surface is relatively great, as it is the case for dished or dome type washers intended to put pressure away from hole in the workpiece and/or to span oversize or elongated holes. However, it is to be noted that such washers are sometimes provided on their outer periphery with axially turned spikes or points, which merely acts to prohibit the lateral shifting of the washer on the workpiece.

At the contrary, the omission of locking teeth or equivalent configurations at the inner periphery of the washer would seriously affect the desired locking action, because of the small mean radius of the bearing surface of the washer in direct engagement with the clamping face of the fastener. It is thus indispensable to provide said bearing surface with structures suitable for providing the desired locking action, but which do not affect the stiffness of the washer for the reasons indicated hereinabove. In this respect, convex and notably cone spring lick washers are known in the art, either or both faces of which are provided with teeth-forming serrations running radially from edge to edge; such washers fulfill the above requirement, but have for an essential drawback that their locking action is directly dependent upon the state of compression of the washer; i.e. upon the load imposed thereon: said locking action is at maximum efficiency when the washer is in flattened condition, whilst it is reduced to substantially zero when the washer is in relaxed condition. Thus, such washers are unsuitable for applications wherein vibrations, dilatations, or compression of an associated sealing gasket may cause substantial variations of the tensile load imposed on the washer.

The present invention aims to the provision of a spring lock washer which will combine in a single piece of the various specific advantages of the several types of washers mentioned hereinabove, whilst being devoid of their inherent drawbacks in view of the specific application contemplated.

It is accordingly an object of the present invention to provide a washer presenting important bearing surfaces to both the fastener and the workpiece, thereby to distribute the tensile loads over large areas.

It is another object of the present invention to provide a washer having a great flexibility whilst affording an important spring-resistance, whereby efficiently to compensate for any stretching of the fastener assembly.

It is a further object of the present invention to provide a washer capable of a secure locking action under the most adverse conditions.

It is a still further object of the present invention to provide a washer adapted to cover or span oversize clearance holes.

And there is also an essential object of the present invention to provide a spring lock washer suitable for use with high strength fasteners, notably by conferring to said washer a configuration permitting its manufacture at low cost from high carbon steel or like spring material of similar hardness, as well as its subsequent heat and/or surface treatment.

These and other objects are fulfilled by the convex spring washer according to the invention, adapted for locking threaded fastener having a flat clamping face, which is remarkable notably in that it comprises a generally annular and curved solid body having plain inner and outer peripheries, said inner periphery defining a circular central hole, said outer periphery having a continuously convex outline radially spaced outwards from the contour of said clamping face of said fastener; said body being formed with a substantially flat, frusto-conical inner portion surrounding said central hole and having radial dimensions which substantially correspond to that of said clamping face of said fastener, and with a plurality of serrations running substantially radially on the outer, or convex face of said inner portion, said serrations being adapted to bite in said clamping face of said fastener.

The advantages afforded by a washer made in accordance with this invention will be readily understood from the foregoing. Notably, this washer constitutes an advantageous substitute for the hitherto used stackings of several conventional washers of different types.

Other features and advantages of the invention will appear as the following description of a few illustrative embodiments proceeds with reference to the accompanying drawings in which:

FIGURE 1 is a perspective view from beneath showing a first embodiment of a washer according to the invention;

FIGURE 2 is a plan view from above of the washer shown on FIGURE 1;

FIGURE 3 is a sectional view of the washer, taken along the line III—III of FIGURE 2 on a larger scale;

FIGURE 4 is a sectional view similar to that of FIGURE 3 showing another embodiment of a washer according to the invention;

FIGURE 5 is a perspective view from above showing a rectangular curved washer according to the invention;

FIGURE 6 is a sectional view similar to that of FIGURES 3 and 4 showing a further embodiment of a washer according to the invention; and FIGURE 7 is a plan view from above of the washer shown on FIGURE 6.

The washer shown on FIGURES 1, 2 and 3 and designated as a whole by 10 comprises essentially a dished annular body having a plain inner edge 11 defining a circular central hole and a plain outer edge 12 having in plan a circular outline coaxial with the inner edge 11.

As shown, the outer and inner diameters of washer 10 are in the ratio of about 3:1, and the thickness of the washer is relatively important with respect to its radial dimensions; thus washer 10 is fairly suitable to cover or span oversize or elongated holes and to sustain important loads, whilst keeping a great flexibility.

As shown on FIGURE 3, the annular inner portion 13 of washer 10 adjoining its inner edge 11 is slightly raised, say offset, in an axial and upwards direction with respect to its remaining outer portion 14. For purposes which will appear hereinafter, said inner portion is frustoconical and formed on its outer or top surface with a plurality of radially running serrations 15, which consist of shallow grooves of substantially triangular cross section carved or impressed in the thickness of the washer; preferably and as shown, the depth of said grooves is substantially equal to the height of the step between the inner and outer portions 13, 14 of the washer, whereby a plurality of teeth are formed between said grooves, which protrude axially on the top surface of the washer and extend radially from its inner edge 11 to the outer limit of its inner raised portion 13.

These teeth or serrations 15 are thus fairly adapted to bite in the clamping face of an associated fasteners, such as the screw 16 shown in chain-dotted lines on FIGURE 3. In this figure, washer 10 is shown in a relaxed condition, but it will be readily understood that upon torquing of screw 16, its clamping face 17 will substantially flatten the inner portion 13 of the washer first, because of the differential stiffness induced by the presence of grooves in said inner portion; hence, the teeth 15 are brought into firm contact with the clamping face of screw 16; owing to the tight angular distribution of said teeth, and provided that they extend radially over a sufficient length, and notably beyond the external contour of the clamping face 17 of the screw, thus the areas of contact are evenly scattered over substantially the whole clamping face 17, so that optimum load distribution and secure locking action are provided.

As torquing of screw 16 is continued, the tension load gradually increases without affecting thereby the flat engagement of the serrated surface 15 of washer 10 with the clamping face 17 of screw 16; therefore, the outer portion 14 of washer 10 is caused progressively to flatten to compensate for the increasing load.

As a consequence, concentrically increasing zones of the concave face of washer 10, which initially rested on the workpiece only by its rim, are successively brought into engagement with said workpiece, thereby providing for an effective distribution of the load thereon; also, by virtue of the relatively great mean radius of said zones, the frictional forces suffice to prevent rotation of the washer.

However, whether lateral shifting of the washer on the workpiece is to be feared, axially turned points or spikes of any suitable configuration may be provided on the outer edge of the washer, as shown by way of example, washer 10 is formed with four axially turned double points 18 disposed at spaced intervals on its outer edge 12.

The washer 20 shown in FIGURE 4 is essentially similar to that shown in FIGURES 1–3, with the exception that its inner portion 23 joins at level with its outer portion 24. Thus, the outer diameter of the serrated surface 25 of washer 20 must be greater than the maximum diameter of the clamping face of the fastener to be locked thereby. Besides, and owing to the differential curvature of its inner and outer portions, washer 20 performs identically the same spring action and locking action as washer 10 previously described.

FIGURE 5 illustrates by way of example, a washer 30 whose outer edge 32 has a rectangular outline in plan, the hole for the passage of a screw or the like being formed preferably but not necessarily in the geometrical center of the washer. The solid body 34 of washer 30 is merely bent along its length, and is formed around its central hole with a flat or conical inner portion 33 on which the serrations 34 are carved or impressed. Of course, washer 30 is more particularly intended to span an elongated hole and to provide great flexibility.

Washer 40 shown in sectional and plan views in FIGURES 6 and 7 respectively, is particularly designed for use with modern high strength fasteners. Accordingly, it is made from relatively thick, springy sheet metal such as high carbon steel. The inner portion 43 is of relatively small radial extent with respect to the diameter of its central hole, to mate with the reduced screw head and nut dimensions of high strength fasteners, Because of the great spring resistance of washer 40, its inner portion 43 is merely flat, but is slightly raised with respect to its conical outer portion 44. Thus, the top face of said inner portion 33 forms a relatively narrow annular track, in which hollow radial serrations 45 are conveniently stamped. Owing to its compact configuration, washer 40 is well adapted for hardening by heat and other treatments.

It is to be noted that in the various embodiments of the invention shown and described herein, the inner and outer portions of the washer, due to their differential curvature and/or to the presence of a step therebetween, behaves substantially like independent, superposed washers which perform the desired locking and spring actions respectively; however, the outer portion of the washer affording a firm axial and radial support to the inner portion integral therewith, and the latter engaging flatly the clamping face of the fastener, a screw locking action 17 provided under the most adverse service conditions.

Of course, the present invention is not limited to the few embodiments shown and described herein, which are given by way of example only, and to which any modifications and improvements within the reach of those skilled in the art could be incorporated without departing from the scope of this invention; notably the shape and configuration of the outer portion of the washer is not critical, and may be adapted to the specific applications contemplated.

What I claim is:

1. A convex spring washer for locking a threaded fastener having a flat clamping face, comprising a generally annular and curved solid body of spring metal having plain inner and outer peripheries, said inner periphery defining a circular central hole, said outer periphery having in plan a continuously convex outline radially spaced outwards from the contour of said clamping face of said fastener; said body being formed with a substantially flat, frusto-conical radially inner portion surrounding said central hole, said radially inner portion being separated from the radially outer portion of said body by structural discontinuity in the curvature of the latter along a circumference, the intersection of said radially inner and radially outer portions along said circumference defining substantially an obtuse angle of less than 180° at the inner surface of said washer, said radially inner portion being formed with a plurality of serrations running substantially radially on its outer or convex face, said serrations being adapted to bite in said clamping face of said fastener.

2. A washer according to claim 1, wherein said radially inner portion is axially raised with respect to said radially outer portion.

3. A washer according to claim 1, wherein said radially inner and radially outer portions join in a plane substantially parallel to the clamping face of the fastener, and are differently curved.

4. A convex spring washer according to claim 1, wherein said outer periphery of said solid body has in plan a substantially rectangular outline spaced outwards from the contour of said clamping face of said fastener; said body being bent along one of its dimensions, and notably along its length.

5. A convex spring washer according to claim 1, wherein axially turned spikes or points are formed on said outer periphery of said body.

References Cited

UNITED STATES PATENTS

| 1,896,650 | 2/1933 | Trotter | 151—35 |
| 1,911,384 | 5/1933 | Olson | 151—35 |
| 2,518,399 | 8/1950 | Thompson | 151—35 |
| 2,794,476 | 6/1957 | Hanneman | 151—38 |
| 3,077,218 | 2/1963 | Ziegler | 151—35 |

FOREIGN PATENTS

| 638,577 | 2/1928 | France. |
| 1,138,521 | 1/1957 | France. |
| 559,578 | 2/1944 | Great Britain. |

CARL W. TOMLIN, *Primary Examiner.*

R. S. BRITTS, G. A. MILWICK, *Assistant Examiners.*